Sept. 29, 1970     H. F. J. SPRENGEL     3,530,998
CARGO LOADING DEVICE
Filed March 21, 1968
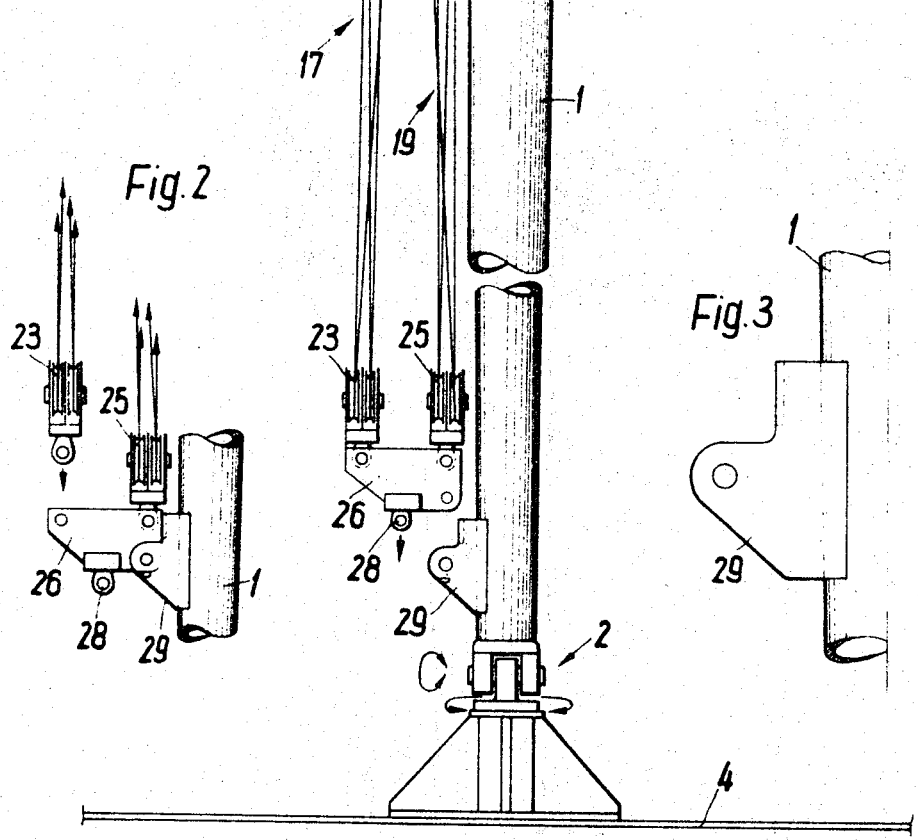
Inventor:
HEINZ FERDINAND JOHANNES SPRENGEL
BY
Kenyon & Kenyon
ATTORNEYS

United States Patent Office 3,530,998
Patented Sept. 29, 1970

3,530,998
CARGO LOADING DEVICE
Heinz Ferdinand Johannes Sprengel, Hamburg, Germany, assignor to Blohm & Voss A.G., Hamburg-Steinwerder, Germany, a company of Germany
Filed Mar. 21, 1968, Ser. No. 714,962
Claims priority, application Germany, Sept. 30, 1967, B 94,755
Int. Cl. B66c 23/52
U.S. Cl. 212—3                    2 Claims

ABSTRACT OF THE DISCLOSURE

Ship's loading apparatus having a cargo boom which is pivotally mounted on a deck and is capable of swinging having a head pin at its upper end arranged transversely to its longitudinal axis which is provided with a swivel engaged by hanger tackle on both sides and including a block whip carried on the head pin at one side of the boom on which a pair of tackle parts are arranged and which respectively embody upper and lower cargo blocks, the latter being connected together for handling a heavy cargo load by a cross member provided with a swivel eye to which said load is connected or being connected to a fixed holder supported near the lower end of the boom when lighter cargo load is to be shifted in which event one of the two lower cargo blocks is disconnected from the cross member and connected to the lighter cargo load.

RELATED APPLICATIONS

There is a related application Ser. No. 599,592, now Pat. No. 3,386,953.

BRIEF SUMMARY OF INVENTION

The invention relates to cargo loading devices and particularly to a cargo derrick pivotally mounted on the deck with a head pin at its upper end arranged transversely to its longitudinal axis and which is provided on both sides with a swivel engaged by the hanger tackle and a block whip on one side.

Ship loading devices are known, for example, Pat. No. 3,236,390 equipped with a derrick boom adapted to swing through between two masts and which carries on both sides at the top a block whip on which the cargo tackles or the cargo blocks are arranged. For hoisting the load when using these heavy cargo gear devices, the lower cargo blocks are joined together by means of a cross member provided, for example, with a load hook.

Since, however, the cargo equipment so provided is not intended to be used exclusively for handling heavy loads but must often be used for handling cargo items of fairly low weight, it has already been proposed, as in the aforesaid pending application, to secure selectively the right-hand or left-hand lower cargo block of the respective hauling tackle part to the lower end of the cargo beam by means of an eyelet adjacent to the gooseneck by known means, for example, by a pin.

In this way, the result is secured so that the fixed part of the cargo tackle, consisting of the upper and lower cargo blocks no longer functions as tackle so that although the useful load operated by the cargo gear or derrick can support amounts only to half the weight for which the cargo tackle was designed, the hook speed is on the other hand doubled as compared with the value which is attained when operating with a heavy load, that is to say, the lifting and lowering speeds of that part of the cargo tackle which is not fixed is increased to a great extent.

This arrangement has proved extremely satisfactory in practice but has the disadvantage that when using the cargo equipment for heavy loads the two cargo tackles or the lower cargo blocks thereof cannot swing through freely between fixed masts because of the cross member transversing them. Since the boom should be able to swing through from front to rear or reversely between two masts at least one of the lower cargo blocks must, for example, be released from the cross member. Moreover, this cargo block must then be retained in a holder or the two lower cargo blocks must be released from the cross member in order that the cross member alone with the other auxiliary means can be brought to the other side.

The resulting loss of time is not only undesirable but also disadvantageous since this requires special attention and care having regard to the possibly dangerous movements of the free-swinging load in the case where the cross member remains fastened off-center to one of the lower cargo blocks.

The invention is directed to the problem of arranging the loading gear in such manner that while maintaining the aforesaid advantages of said pending application, namely, on the one hand the possibility of using the loading gear for heavy products and on the other hand for handling lighter goods at correspondingly higher hook speeds, the complicated releasing of the cross memmer joining the two lower cargo blocks can be eliminated.

This object is attained according to the invention by the fact that the block whip supports two cargo tackle parts embodying in each case an upper cargo block and a lower cargo block in which the latter are connected by means of a cross member provided, for example, with a swivel eye in such manner that selectively both sets of tackle simultaneously or only the left-hand or the right-hand cargo tackle part can be loaded.

The technical advantage obtained in this way is considerable since when using the cargo tackle for lighter loads with a correspondingly higher hook speed, the frequent release of the cross member, the presence of which is necessary when handling heavy loads, is no longer necessary. As will be further explained in conjunction with the following description of a preferred embodiment, on swinging the boom from its mid-position to, for example, a front or rear inclined position, the cross member can swing freely through between fixed masts, for example.

It should be noted that when securing one or other cargo blocks, load handling for comparatively light weights but at correspondingly high hook speeds is possible. The increase in the load hook speed is dependent inter alia on the purchase of the cargo tackle parts and provision can, for example, be made that the two cargo tackle parts have the same purchase whereby the hook speed is doubled.

It is, however, possible for the two cargo tackle parts to have different purchase factors so that when retaining one of the lower cargo blocks the load hook speed is, for example, increased by three times.

In order to ensure that the heavy load equipment can be converted with only a few manipulations into a cargo gear for handling comparatively lighter, smaller loads at increased hook speeds, a further feature of the invention consists in the fact that the cross member is adapted to be retained by means of a holder secured on the cargo beam in the region of the gooseneck.

The swing-over of the block whip carrying the two cargo tackle parts requires a special cable guide in order that rubbing of the cables will be reliably avoided. This is taken care of by the fact that the block whip embodies a guide block in the region of the top pivotally supported cargo blocks which is, for example, supported by means of a universal joint. It is, however, also possible to support the guide blocks pivotally in other ways or to arrange it in a fixed manner.

Other objects and features of the invention will become apparent from the following detailed description and the accompanying drawings forming a part hereof and wherein:

FIG. 1 is a side view of an arrangement embodying the invention;

FIG. 2 is a detail and

FIG. 3 is a detail of FIG. 2 on a larger scale.

DETAILED DESCRIPTION

The cargo derrick shown in the drawings has a boom 1 pivotally or universally supported at its lower part on a deck 4 of a ship, not otherwise shown, by means of a gooseneck bearing 2. This boom and gooseneck may be centrally positioned between a pair of masts (not shown) as in said patent and pending application if desired. At its upper part the boom 1 embodies a cross pin 5 running transversely to the length thereof which carries on each projecting side respective swivels 7, 8 to which are connected respective span tackles 13, 14 as by means of span coupler means 10, 11.

The head pin 5 further carries a block whip 16 pivotally arranged on one side of the boom 1. Two cargo tackle parts 17, 19 are arranged on said whip 16 and embody respectively upper pivotal cargo blocks 20, 22 and lower cargo blocks 23, 25, the latter being connected together when using the cargo equipment for handling heavy cargo products as by means of a cross member 26 provided, for example, with a swivel eye 28 to which latter the cargo are fastened. This operative connection is effected as by means of a connecting pin or bolt, not shown.

A holder 29 is provided being secured on the boom 1 adjacent to the gooseneck 2 by which the cross member 26 and thus either the right-hand or left-hand lower cargo block 23 or 25 can be retained when the cargo equipment is to be used for handling comparatively lighter smaller loads in which case only one of the cargo tackle parts 17 or 19 is used being secured to the lighter load with a correspondingly higher load hook speed. This operative condition is shown in FIG. 2.

The path of a load cable 31 coming from a cargo winch, not shown, is as follows: The cable 31 passes over a guide roller 32 arranged above the block whip 16, passes through a hole, not shown, in the block whip 16 and thence to the lower cargo block 25 then to the upper cargo block 22 and back to the lower cargo block 25, then over a universally pivoted guide block 34 arranged in a recess 16a of the block whip 16 to the lower cargo block 23, then to the upper cargo block 20 and back to the lower cargo block 23, then passing through a further hole, not shown, in the block whip 16 and a guide roller 35 arranged over the block whip and then back to the said same cargo winch or to another separate cargo winch. When using one cargo winch only, the other end of the load cable 31 is fastened to one of the corresponding masts, not shown. It will be understood that the loading gear provided according to the invention is applicable to those cargo derricks which are supported to swing through between two or more posts or masts arranged on the deck. The latter, however, are not necessary.

Although a specific embodiment of the invention has been shown and described, variations within the scope of the appended claims are possible and are contemplated. There is no intention, therefore, of restriction to the exact abstraction or disclosure hereinabove presented.

What is claimed is:

1. Cargo loading gear for a ship or the like having a cargo boom, means for supporting said boom for swing through maneuver between a pair of uprights, twin span guides, a pair of span tackle means independent of each other, guide means provided at the head of said cargo boom and at respective heads of said uprights serving automatically to guide said span tackle means freely, a transversely disposed head bolt adjacent the upper end of said cargo boom, a pendulum purchase block fitting pivotally supported on said pin to one side of said boom, purchase tackle pivotally carried by said purchase block in its lower region, a pair of guide rollers pivotally supported by said purchase block to rotate on vertical axes for guidance of hauling parts of said purchase tackle, said purchase tackle comprising two tackle parts including a pair of upper purchase blocks secured to the pendulum purchase block fitting and a pair of lower purchase blocks, a cross-piece element joinable selectively to said lower purchase blocks, a fitting fixedly secured to the lower region of said cargo boom to which one of said lower purchase blocks and said cross-piece are secured for handling light cargo, said cross-piece being secured to both said lower purchase blocks in handling heavy cargo.

2. Cargo loading gear for a ship or the like according to claim 1, wherein said purchase block fitting has a recess and a guide pulley arranged in said recess for hoisting elements of the cargo tackle parts.

References Cited

UNITED STATES PATENTS

| 578,495 | 5/1897 | Moran | 212—28 |
| 3,375,937 | 4/1968 | Bradshaw | 212—3 |
| 3,386,593 | 6/1968 | Sprengel | 212—3 |

HARVEY C. HORNSBY, Primary Examiner

U.S. Cl. X.R.

254—189